United States Patent
Prioletti et al.

(10) Patent No.: US 12,071,157 B1
(45) Date of Patent: Aug. 27, 2024

(54) CORRELATING PERCEPTION ERRORS WITH VEHICLE BEHAVIOR

(71) Applicant: Zoox, Inc., Foster City, CA (US)

(72) Inventors: Antonio Prioletti, Redwood City, CA (US); Subhasis Das, Menlo Park, CA (US); Minsu Jang, San Mateo, CA (US); Peng Wang, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 362 days.

(21) Appl. No.: 17/590,046

(22) Filed: Feb. 1, 2022

Related U.S. Application Data

(63) Continuation-in-part of application No. 17/541,950, filed on Dec. 3, 2021, now Pat. No. 11,938,966.

(51) Int. Cl.
*B60W 60/00* (2020.01)
*B60W 40/09* (2012.01)
*G06V 20/58* (2022.01)

(52) U.S. Cl.
CPC .......... *B60W 60/001* (2020.02); *B60W 40/09* (2013.01); *G06V 20/58* (2022.01); *B60W 2420/403* (2013.01); *B60W 2554/4049* (2020.02)

(58) Field of Classification Search
CPC ............... B60W 60/001; B60W 40/09; B60W 2420/403; B60W 2554/4049; G06V 20/58
See application file for complete search history.

(56) References Cited

U.S. PATENT DOCUMENTS

| 11,715,338 | B2 | 8/2023 | Vejalla | |
|---|---|---|---|---|
| 2020/0351438 | A1 | 11/2020 | Dewhurst | |
| 2021/0049377 | A1* | 2/2021 | Hu | G06V 10/25 |
| 2022/0148130 | A1* | 5/2022 | Tang | G06N 3/045 |

FOREIGN PATENT DOCUMENTS

| CA | 3066337 A1 | 6/2021 | |
|---|---|---|---|
| CN | 112166304 A * | 1/2021 | G01S 13/865 |

OTHER PUBLICATIONS

Banerjee, et al., "Real-Time Error Detection in Nonlinear Control Systems Using Machine Learning Assisted State-Space Encoding," IEEE Transactions on Dependable and Secure Computing, vol. 18, No. 2, 2021, pp. 576-592.

\* cited by examiner

*Primary Examiner* — Brian P Sweeney
(74) *Attorney, Agent, or Firm* — Lee & Hayes, P.C.

(57) ABSTRACT

Techniques for correlating perception system errors with unwanted vehicle behavior. The techniques may include receiving log data associated with a vehicle traversing an environment. Based at least in part on the log data, an error associated with an output received from a perception component of the vehicle may be identified. The output of the perception component may be associated with a detection of an object in the environment. The techniques may also include determining that the error contributed to an unwanted behavior of the vehicle. In some examples, a simulation of a planner component of the vehicle may be ran using ground truth data to determine that the error contributed to the unwanted behavior. Based at least in part on the error contributing to the unwanted behavior, a parameter of the perception component may be updated to minimize the error and the unwanted behavior.

20 Claims, 6 Drawing Sheets

CORRELATING PERCEPTION ERRORS WITH VEHICLE BEHAVIOR

RELATED DOCUMENTS

This application is a continuation in part of U.S. patent application Ser. No. 17/541,950, filed on Dec. 3, 2021, which is incorporated herein by reference in its entirety and for all purposes.

BACKGROUND

Autonomous vehicles utilize various systems, methods, and apparatuses to traverse an environment. For instance, autonomous vehicles may utilize machine-learned models to navigate through environments where other vehicles, people, buildings, or other objects may be present. In some cases, developing machine-learned models for use in autonomous vehicle navigation can be challenging. For instance, because autonomous vehicles can utilize multiple machine-learning pipelines and computer-based algorithms to traverse an environment, it can be difficult to validate whether a specific model is operating properly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
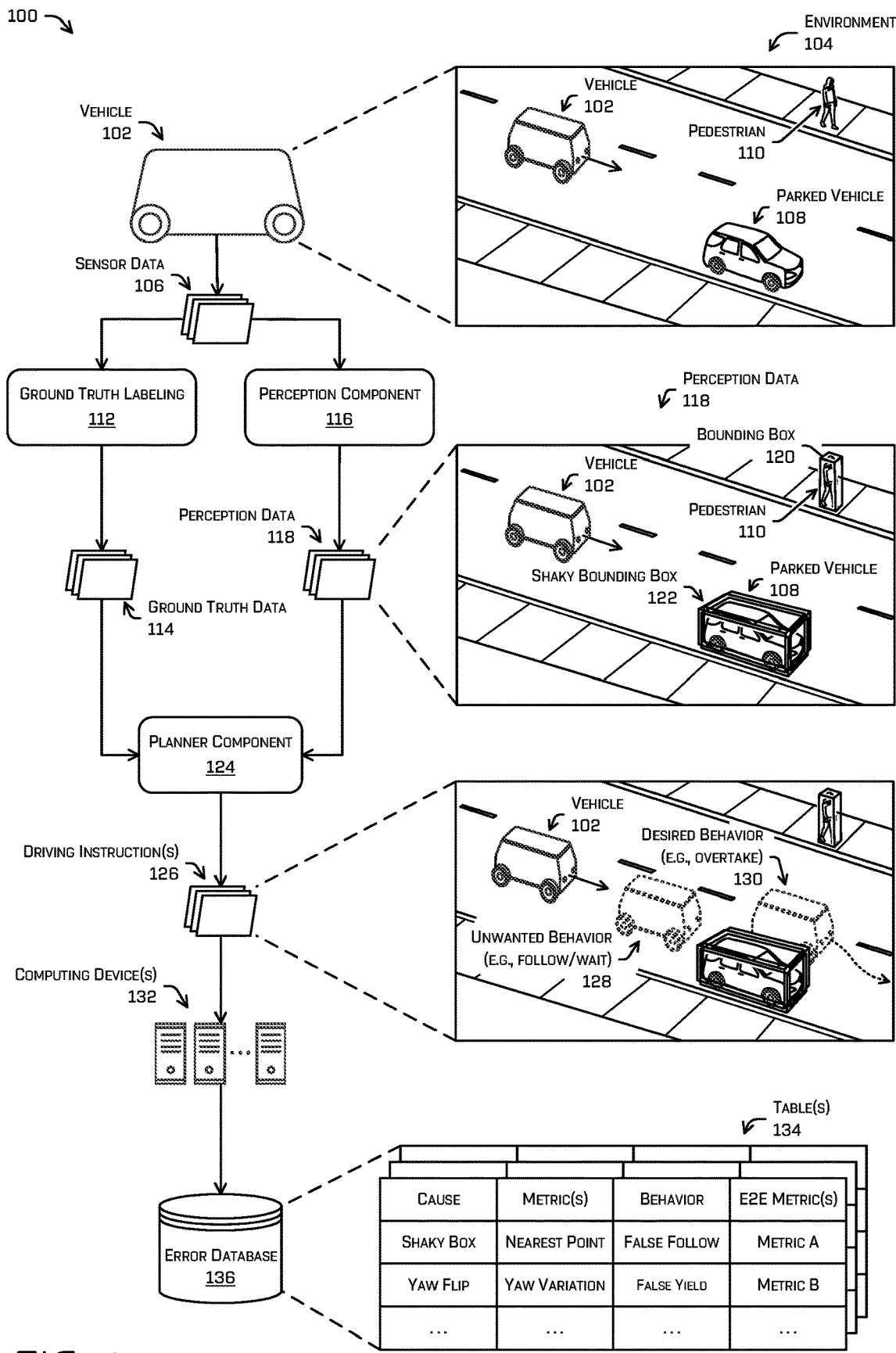
FIG. 1 is a pictorial flow diagram illustrating an example process according to the techniques described herein for determining an effect of an error associated with an output from a perception system of a vehicle on downstream components.

As noted above, developing machine-learned models for use in autonomous vehicle navigation can be challenging. For instance, because autonomous vehicles may utilize multiple machine-learning pipelines or other computer-based algorithms to traverse an environment, it can be difficult to determine whether a specific model is working properly. Take, for example, a perception pipeline (e.g., one or more machine-learned models) of a vehicle that receives, as inputs, sensor data (e.g., image data, lidar data, radar data, time of flight data, etc.) associated with an environment and outputs one or more regions of interest, segmentations, classifications, and/or other information associated with the environment (e.g., bounding boxes associated with objects in the environment). In some cases, developers of the perception pipeline may desire to evaluate its performance and make updates as necessary to improve the pipeline.

Described herein are techniques associated with determining an impact of perception errors on performance of downstream components. For example, the techniques described herein may determine correlations between perception system errors and unwanted vehicle behaviors in order to update and/or evaluate performance of a vehicle perception system. In some examples, log data may be received that is associated with a vehicle traversing an environment. Based at least in part on the log data, a determination may be made that, while the vehicle was traversing the environment, an output received from a perception component of the vehicle included an error. Additionally, in some examples ground truth perception data associated with the vehicle traversing the environment may be used to run a simulation of a planner component of the vehicle. Based at least in part on a comparison of the simulation to the log data, a determination may be made that the perception error contributed to an unwanted behavior of the vehicle. That is, the perception error may have contributed to the vehicle performing an action that is different from an action that the vehicle would have performed if the error had not been present. In some examples, one or more metrics associated with the perception output may provide an indication of how and/or an extent to which the perception output contributed to the error, and a correlation may be determined between the one or more metrics and the unwanted behavior of the vehicle. Based at least in part on the correlation, a parameter of the perception component may be updated to minimize or reduce the error and reduce the unwanted behavior of the vehicle. That is, the perception component may be updated to minimize the perception errors that are contributing to any unwanted vehicle behavior. In some examples, the metric(s) may be suggestive as to the parameter that should be updated and/or how the parameter should be updated to minimize or reduce the error. For instance, the metric(s) may be indicative of a parameter of the perception system that is associated with certain detections that are contributing to the errors. That is, if, for example, errors are commonly associated with detections of pedestrians, the metric(s) may be suggestive that a parameter of the perception system that is configured to make detections associated with pedestrians should be updated. In some examples, the unwanted vehicle behavior may be uncomfortable, unnecessary, or unusual (e.g., harsh braking for no reason, remaining stationary when it is acceptable to proceed, swerving or changing lanes for no reason, or the like).

By way of example, and not limitation, a method according to this disclosure may include techniques of receiving log data associated with a vehicle traversing an environment. In some examples, the log data may include sensor data generated by a sensor system of the vehicle while the vehicle was traversing the environment. For instance, the log data may include image data captured by one or more image sensors (e.g., cameras) of the vehicle, lidar data generated by one or more lidar sensors of the vehicle, radar data generated by one or more radar sensors of the vehicle, or the like. In some examples, the log data may also include perception data generated by a perception component of the vehicle. The perception component may include one or multiple machine-learned models or other computer-based algorithms that are configured to make detections, segmentations, classifications, and/or other determinations associated with the environment. For instance, the perception component may be configured to detect regions of interest in the environment of the vehicle, such as bounding boxes associated with objects that are in the environment. Additionally, in some examples, the log data may include a path that was traversed by the vehicle through the environment, a listing of faults associated with components of the vehicle that occurred while the vehicle was traversing the environment, video logs of the vehicle traversing the environment, and the like.

In some examples, the techniques may include identifying, in the log data, an error associated with an output received from the perception component of the vehicle. In some examples, the output may be associated with a detection of an object in the environment. For instance, the output may include a bounding box associated with the object, a classification associated with the object (e.g., whether the object is a pedestrian, a vehicle, a cyclist, an animal, a building or structure, vegetation, or the like), velocity information associated with the object, an orientation of the object, or the like. In some examples, the error associated with the output may include, among other things, an unstable bounding box associated with the object, an inaccurate detected size of the object, an inaccurate detected orientation of the object, a failure to detect the object (e.g., false-negative), a false-positive detection of an object that is not actually present in the environment, an inaccurate classification of the object, or the like. In some examples, the error may be identified or otherwise determined based at least in part on a comparison between the perception output(s) and a labeled ground truth associated with the object.

In some examples, the techniques may include determining that the perception error contributed to an unwanted behavior of the vehicle. As used herein, an unwanted behavior of the vehicle may be an action of the vehicle that the vehicle would not normally perform if the perception error was not present (e.g., if perception was perfect). In some examples, unwanted behaviors of the vehicle may include, but are not limited to: following or stopping behind a parked vehicle instead of passing or overtaking the parked vehicle, harsh or sudden braking when the vehicle should be maintaining its speed, unnecessary swerving or changing lanes, yielding to other vehicles that do not have the right-of-way, driving too fast or too slow for the conditions, or the like.

In some examples, whether the perception error contributed to the unwanted behavior of the vehicle may be determined based at least in part on a simulation of one or more downstream components of the vehicle (e.g., components that use, as inputs, the perception component outputs) using ground truth data. In some examples, the downstream components may include a planner component of the vehicle, a prediction component of the vehicle, or other components described herein. For example, a simulation may be run using a planner component of the vehicle where, instead of inputting the perception data into the planner component, ground truth perception data (e.g., perception outputs that are user-labeled or otherwise do not contain errors) may be used as the inputs to the planner component. In this way, the outputs of the planner component (e.g., trajectories that the vehicle is to follow) are not affected by the perception errors. As such, if the planner component causes the vehicle to perform an action or behavior based on the ground truth perception data, and if that action or behavior is different from actions or behaviors caused by the planner based on the faulty perception data, then those actions or behaviors may be classified as unwanted, in some instances. For example, if the perception error is associated with a detected velocity of an object, the unwanted behavior of the vehicle may include following the object instead of overtaking or passing the object. As another example, if the perception error is associated with a detected size of the object, the unwanted behavior of the vehicle may include decelerating or stopping the vehicle instead of maintaining velocity. As yet another example, if the error is associated with a detected orientation of the object, the unwanted behavior of the vehicle may include either one of yielding to the object or refraining to yield to the object.

In some examples, the techniques may include determining one or more metrics associated with the output that contributed to the error. That is, in some instances, metrics may be determined for each output (e.g., bounding box) generated by the perception component, and a determination may be made as to which one(s) of those metrics contribute to the unwanted behavior of the vehicle. In some examples, the metrics associated with the perception component outputs may include, but are not limited to, yaw metrics, nearest point metrics, segmentation metrics, size metrics, classification metrics, articulation metrics, detection delay metrics, or the like. As an example, if the perception error is an unstable bounding box associated with a stationary object, then the metrics(s) that contributed to the perception error could likely include yaw metrics and/or nearest point metrics. As another example, if the perception error is a false negative associated with an object in the environment, then the metric(s) that contributed to the perception error could likely include detection delay metrics indicative of a delay time between when the object should have first been detected (determined using the ground truth) and when the object was actually detected by the perception component (e.g., while the vehicle was traversing the environment or during a simulation based on log data). In some examples, error(s) associated with the perception outputs may be determined based at least in part on values or other data associated with the metrics.

In some examples, the techniques may include determining a correlation between the one or more metrics that contributed to the perception error and the unwanted behavior of the vehicle. In some examples, an end-to-end behavior metric may be determined based at least in part on the correlation. In other words, whether a perception system output or error can be associated with an end-to-end behavior metric may be based at least in part on the correlation between individual metrics associated with the output (e.g., errors in the perception data) and the unwanted behavior. For instance, an example of an end-to-end metric could be perception detections with an unstable bounding box for stationary objects that are being followed in a real scenario (e.g., full automation pipeline) but are not being followed using the ground truth perception data, and the conditions of this end-to-end behavior metric could be false positive follows (behavior) and nearest point and yaw variations across frames for stationary objects (metrics). In this way, individual cases in log data may be identified for this specific end-to-end behavior metric when the log data and/or the ground truth data indicates that an unstable bounding box error has occurred, a false positive follow has occurred, and there is nearest point and yaw variation across frames for the stationary object. More generally, end-to-end behavior metrics may be a metric associated with an entire vehicle autonomous driving system that may include multiple subsystems/components, including a perception component.

Aspects of this disclosure are related to determining a level of performance associated with a perception component through the use of end-to-end behavior metrics. The end-to-end behavior metrics can include several aspects, as will be disclosed herein, and may include a perception metric associated with a behavior of the vehicle and a violation in the behavior of the vehicle (as a result of the perception metric being violated). The behavior of the vehicle can be a result of a perception metric being violated or an output of a perception component being inaccurate. The behavior of the vehicle can be determined through the use of components of an autonomous driving system other than a perception component (e.g., a prediction component or a planning component). As should be understood, other behavior violations of the vehicle or other perception metric violations may occur without violating an end-to-end metric if the perception violation and behavior violation are not associated with each other. The combination of the two enables a perception component's performance to be evaluated through the use of such metrics. In some examples, end-to-end behavior metrics may be indicative or suggestive of which parameter(s) of the perception pipeline need to be updated and/or how the parameter(s) need to be updated.

In some examples, one or more parameters of the perception component may be updated to minimize the perception error and reduce the unwanted behavior of the vehicle. In some examples, the one or more parameters may be updated based at least in part on the correlation between the one or more metrics that contributed to the perception error and the unwanted behavior of the vehicle. In one example a difference may be determined between the one or more metrics and one or more corresponding ground truth metrics associated with the output, and updating the parameter of the perception component may reduce the difference between the one or more metrics and the one or more corresponding ground truth metrics. In some examples, an updated version of the perception component that includes the one or more updated parameters may be sent to one or more vehicles of a fleet of vehicles. The one or more vehicles may utilize the updated perception components to make detections associated with objects while traversing an environment.

In practice, the disclosed end-to-end metrics can be used to assess a performance of a perception component of an (autonomous) vehicle. For example, multiple end-to-end metrics can be used to evaluate a perception component. As disclosed herein, each end-to-end metric can be associated with a certain combination of perception metric and vehicle behavior (wherein the perception metric may be associated with the vehicle behavior for the end-to-end metric). The end-to-end metrics can be scored to determine if a perception component has acceptable performance or if there are certain areas of the perception component that may require more attention. In examples, the end-to-end metrics can be scored. The scoring can include qualified results (e.g., pass/fail) or quantified results (e.g., 1, 2, 3, etc.) for each end-to-end metric. The resulting results of each end-to-end metric can be aggregated or otherwise analyzed. For example, certain groups of end-to-end metrics can be associated with a perception component's ability to perceive a large vehicle, an articulated vehicle, road debris, a pedestrian, a certain color of car, etc. By analyzing the results of the end-to-end metrics, a performance of a perception component can be characterized and performance improvements or regressions determined. In some examples, the scoring can be used to determine if a certain version of perception component is sufficient for a certain environment (e.g., an urban environment, a dessert environment, or any combination of environment features).

In some examples, visualizations associated with the end-to-end behavior metrics may be generated to assist engineers in updating the perception component. In some examples, the visualizations may illustrate differences between vehicle behaviors in log data (e.g., based on perception errors) and vehicle behaviors in simulations (e.g., based on labeled, ground truth perception data). For instance, a visualization may include a side-by-side visualization of the vehicle in log data and the vehicle in a simulation. Examples of visualizations for assisting in updating perception components and other machine-learned models, as well as techniques for generating visualizations, are described in U.S. patent application Ser. No. 17/538,836, which is incorporated herein by reference in its entirety and for all purposes. In some examples, these visualization may further be used to perform A/B comparisons of different versions of perception components.

According to the techniques described herein, several advantages can be realized. For instance, by determining which perception errors impact end-to-end behavior of a vehicle, the performance of vehicle perception systems can be improved by providing engineers with access to data that was previously not readily available. Further, the various methods, algorithms, and rules described herein for correlating perception errors with unwanted vehicle behavior require less compute power to run than previous methods, thereby improving the operation of a computer by freeing up additional compute for other tasks. In some examples, the methods described herein for correlating the perceptions errors with the unwanted vehicle behavior can be performed in parallel (e.g., multiple correlations being made at the same time), which additionally improves computer operation.

The techniques described herein can be implemented in a number of ways. Example implementations are provided below with reference to the following figures. Example implementations are discussed in the context of autonomous vehicles: however, the methods, apparatuses, and components described herein can be applied to a variety of components (e.g., a sensor component or a robotic platform), and are not limited to autonomous vehicles. For example, the techniques can be utilized in an aviation or nautical context, or in other machine-learning contexts. Furthermore, the techniques described herein can be used with real data (e.g., captured using sensor(s)), simulated data (e.g., generated by a simulator), or any combination of the two.

FIG. 1 is a pictorial flow diagram illustrating an example process 100 according to the techniques described herein for determining an effect of an error associated with an output from a perception system of a vehicle 102. In examples, the vehicle 102 may be associated with one or more sensor components. In at least one example, the sensor component(s) may capture sensor data 106 associated with an environment 104 surrounding the vehicle 102. The environment 104 may include one or more objects, such as the parked vehicle 108, the pedestrian 110, and/or other objects (e.g., cyclists, animals, vegetation, buildings, streetlights, etc.). In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB. IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data 106 associated with the environment 104, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc. In some examples, the sensor data 106 may be referred to herein as "log data." which may be stored for an infinite period of time.

In at least one example, the sensor data 106 may be sent to a ground truth labeling component 112. The ground truth labeling component 112 may include functionality for generating ground truth data 114 (e.g., ground truth perception data) based on the sensor data 106. For example, the ground truth data 114 may include labeled bounding boxes (e.g., similar to or the same as the bounding box 120) for the objects represented in the sensor data 106. In some examples, the ground truth data 114 may be generated or otherwise determined by a human labeler and/or a computer-based algorithm. For instance, in one example, the human labeler may generate the ground truth data 114 while, in other examples, the computer-based algorithm may generate the ground truth data 114. In at least one example, the computer-based algorithm may generate initial ground truth data and the human labeler may confirm or make corrections to the initial ground truth data to generate the ground truth data 114. In any way, the ground truth data 114 represents the actual environment 104 represented in the sensor data 106. In other words, errors between the ground truth data 114 and the environment 104, as the environment 104 actually exists, should be very minimal. An example associated with labeled ground truth data 114 is shown below in FIG. 2B.

Additionally, the sensor data 106 may also be input to a perception component 116 that may be configured for use in the vehicle 102. The perception component 116 may generate perception data 118 based at least in part on input sensor data 106. In one example, the perception component 116 includes one or more machine-learned models and/or other computer-based algorithms for generating the perception data 118. The perception data 118 output by the perception component 116 may include, among other things, bounding boxes associated with the objects in the environment 104, such as the bounding box 120 associated with the pedestrian 110 and the unstable bounding box 122 associated with the parked vehicle 108, classifications associated with the objects, velocities associated with the objects, or the like. In some examples, the bounding boxes 120 and 122 may be indicative of information associated with the objects to which they correspond, such as a size (e.g., volume, length, width, height, etc.), extent, position, location, orientation, segmentation (e.g., whether the vehicle is a truck and trailer, etc.), and the like. As further described below and herein, the unstable bounding box 122 may be associated with a perception component 116 error. For instance, although the parked vehicle 108 is actually stationary, the unstable bounding box 122 may falsely indicate or otherwise be interpreted by a downstream component that the parked vehicle 108 is in motion.

In some examples, the ground truth data 114 and the perception data 118 may be used as inputs to a planner component 124. The planner component 124 may be configured to, among other things, determine driving instruction(s) 126 for the vehicle 102. That is, the planner component 124 may determine one or more trajectories for the vehicle 102 to follow through the environment 104 in order to navigate from a first location to a second location.

In some examples, the driving instruction(s) 126 determined by the planner component 124 using the perception data 118 as an input may cause the vehicle 102 to perform an unwanted behavior 128. For instance, because the perception data 118 includes the unstable bounding box 122 associated with the parked vehicle 108, the planner component 124 (or a prediction component) may determine that the parked vehicle 108 is in motion. As such, the planner component 124 may determine driving instruction(s) 126 for the vehicle 102 that cause the vehicle 102 to follow the parked vehicle 108. However, because the parked vehicle 108 is actually stationary, the vehicle 102 may end up stopping and/or waiting behind the parked vehicle 108 for a period of time.

In some examples, a simulation may be performed with the planner component 124 using the ground truth data 114 (e.g., ground truth perception data) as an input. That is, instead of using the perception data 118 that includes the unstable bounding box 122 during the simulation, the planner component 124 may use, as inputs, ground truth perception data that is free of errors. In the simulation, the driving instruction(s) 126 determined by the planner component 124 based on the ground truth data 114 may cause the vehicle 102 to perform a desired behavior 130. For instance, because the ground truth data 114 would include a bounding box indicating that the parked vehicle 108 is stationary, the planner component 124 (or a prediction component) may determine that the parked vehicle 108 is not in motion (e.g., static). As such, the planner component 124 may determine driving instruction(s) 126 for the vehicle 102 that cause the vehicle 102 to overtake or otherwise pass the parked vehicle 108.

In some examples, the computing device(s) 132 may receive the ground truth data 114, the perception data 118, the driving instruction(s) 126, the sensor data 106 (e.g., log data). In some examples, the computing device(s) 132 may analyze this data to determine whether the perception data 118 includes any detection errors, to identify whether the vehicle 102 engaged in any unwanted behavior (e.g., such as the unwanted behavior 128), to determine whether the planner component 124 caused the vehicle 102 to perform different in a simulation using the ground truth data as opposed to the perception data 118, or the like. In some examples, the computing device(s) 132 may generate one or more table(s) 134 associated with perception metrics, perception errors, potential causes, or the like. In some examples, the computing device(s) 132 may store these table(s) 134 in an error database 136. In some examples, the table(s) 134 may comprise discrete probability models conditioned on several parameters, such as object distance, error magnitude, error duration, etc., that describe the likelihood or frequency in which the perception component 116 makes a certain error that falls within a predefined error group. In examples, separate table(s) 134 may be built for different perception component outputs, object types, and interactions the object had with the planner component 124 of the vehicle 102. By way of example, and not limitation, error types or metrics that may be captured in the table(s) 134 may include frame-based errors, such as object position, velocity, yaw, size, and extent, as well as event-based errors, such as false negatives, false positives, yaw flips, over segmentation, unstable (e.g., shaky) bounding boxes, or the like. Additionally, object types (e.g., classes) that may be included in the table(s) 134 may include vehicles, pedestrians, cyclists, animals, etc. In some instances, durations of errors may also be indicated in the table(s) 134.

In some examples, end-to-end perception metrics may be defined for correlating certain perception errors with certain unwanted behaviors of the vehicle. For instance, an end-to-end perception metric may be created for situations in which unstable bounding boxes cause the vehicle to wait behind stationary objects that the vehicle otherwise would pass or overtake in a ground truth simulation. In some examples, the computing device(s) 132 may store one or more rule(s) that it uses to classify or otherwise determine whether a perception output includes an error that causes an unwanted behavior. To continue the above example of the end-to-end perception metric for situations in which unstable bounding boxes cause the vehicle to wait behind stationary objects, the rule(s) stored to identify whether this type of event has occurred in log data may include a condition that a false positive follow of a stationary object has occurred (which may be determined based on a ground truth planner simulation) and that the perception output corresponding with the stationary object includes nearest point and yaw variation metrics across frames. In this way, events matching the end-to-end metric may be identified in log data for use in determining whether updates to the perception component 116 are actually improving the performance of the perception component 116 with respect to minimizing the unwanted vehicle behavior.

In some examples, the perception component 116 may be updated based on determining that the perception component 116 is causing the vehicle 102 to engage in unwanted behavior. For instance, the perception component 116 may be updated by retraining the perception component 116 using a new dataset, changing a weighting of a cross function of a machine-learned model of the perception component 116, or the like. After the perception component 116 has been updated, the updated version of the perception component 116 may be sent to one or more vehicles, including the vehicle 102, for use in traversing a real environment. In some examples, the vehicle 102 may be part of a fleet of vehicles that provide various transportation services for people, cargo, mapping purposes, checking road conditions, surveillance, or the like.

Figure 2A:
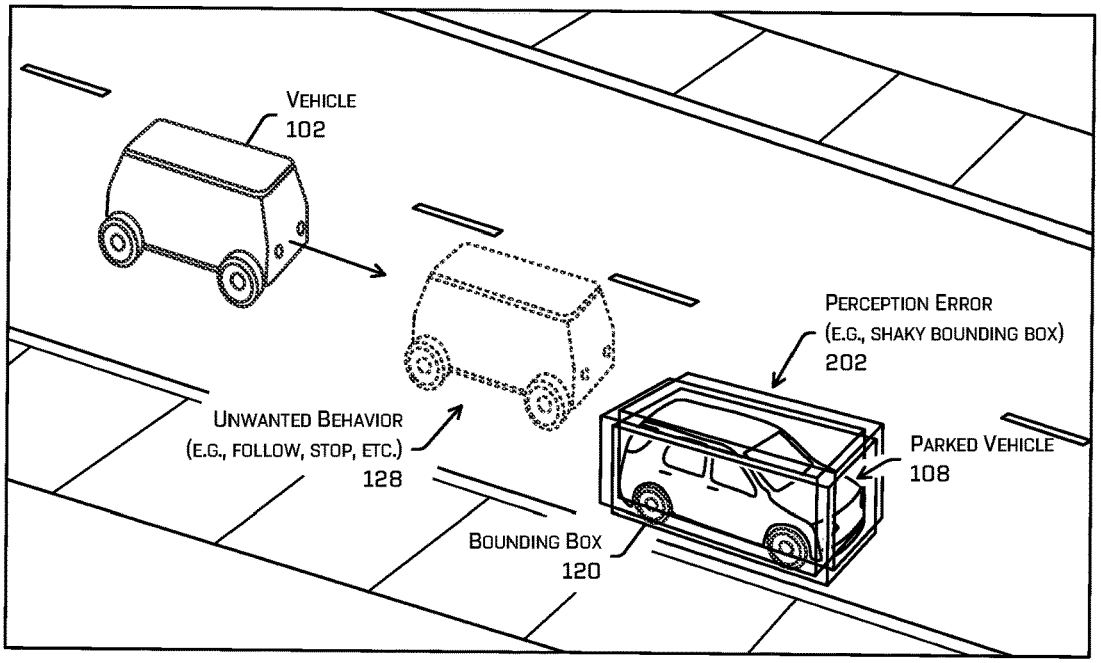
FIG. 2A illustrates an example in which a perception error contributes to an unwanted behavior of a vehicle.

FIG. 2A illustrates an example 200 in which a perception error 202 contributes to an unwanted behavior of a vehicle 102. The perception error 202 illustrated in the example 200 is an unstable bounding box 120 associated with a parked vehicle 108. That is, instead of the bounding box 120 maintaining a constant position between perception data frames, the position of the bounding box 120 relative to the parked vehicle 108 changes slightly, causing the bounding box 120 to appear "shaky" or otherwise dynamic.

In some examples, and as described herein, an unstable bounding box 120 may have effects on downstream components associated with the vehicle 102. For instance, prediction components and/or planner components associated with the vehicle 102 may determine that the parked vehicle 108 is in motion based on the perception error 202, instead of determining that the parked vehicle 108 is static. As such, the vehicle 102 may perform the unwanted behavior 128. For instance, the unwanted behavior may be to follow; stop for, or otherwise yield to the parked vehicle 108. Additionally, or alternatively, the unwanted behavior may be to slow down for the parked vehicle 108 out of caution or to enter a cautionary state.

Figure 2B:
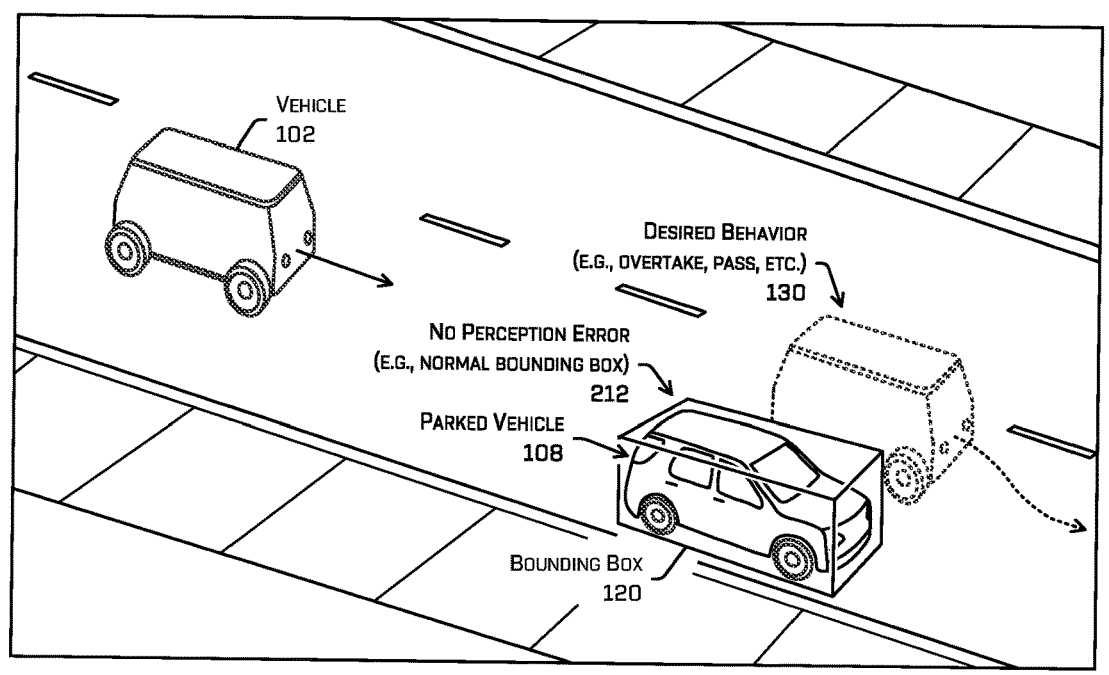
FIG. 2B illustrates an example in which the vehicle performs a desired behavior based at least in part on the perception error being remedied.

FIG. 2B illustrates an example 210 in which the vehicle 102 performs a desired behavior 130 based at least in part on the perception error being remedied. For instance, as opposed to the unstable bounding box 120 perception error 202 illustrated in the example 200, the bounding box 120 associated with the parked vehicle 108 in the example 210 maintains a constant position relative to the parked vehicle 108 between frames. In other words, rather than appearing to move or shake between frames of perception data, the bounding box 120 remains static between frames. Because the parked vehicle 108 is stationary and the bounding box 120 is otherwise normal, there is no perception error 212 illustrated in the example 210. In some examples, the bounding box 120 associated with the parked vehicle 108 that includes no perception error 212 may be representative of labeled ground truth data (e.g., ground truth perception data), such as the ground truth data 114 described above in FIG. 1.

Based at least in part on the bounding box 120 being stationary, the prediction components and/or planner components associated with the vehicle 102 may determine that the parked vehicle 108 is actually a parked vehicle (e.g., static). As such, the vehicle 102 may perform the desired behavior 130. For instance, the vehicle 102 may overtake or otherwise pass the parked vehicle 108. That is, the desired behavior 130 may be to operate the vehicle 102, which may be an autonomous or semi-autonomous vehicle, the same way that a traditional, human operated vehicle would be operated under the same circumstances.

In some examples, the visualizations shown in FIGS. 2A and 2B can be displayed in a side-by-side comparison for assisting in updating a perception component of a vehicle. For instance, the visualization in FIG. 2A may be displayed next to the visualization in FIG. 2B to illustrate the differences of behavior of the vehicle 102 when a perception error is present as opposed to when no perception error is present.

Figure 3A:
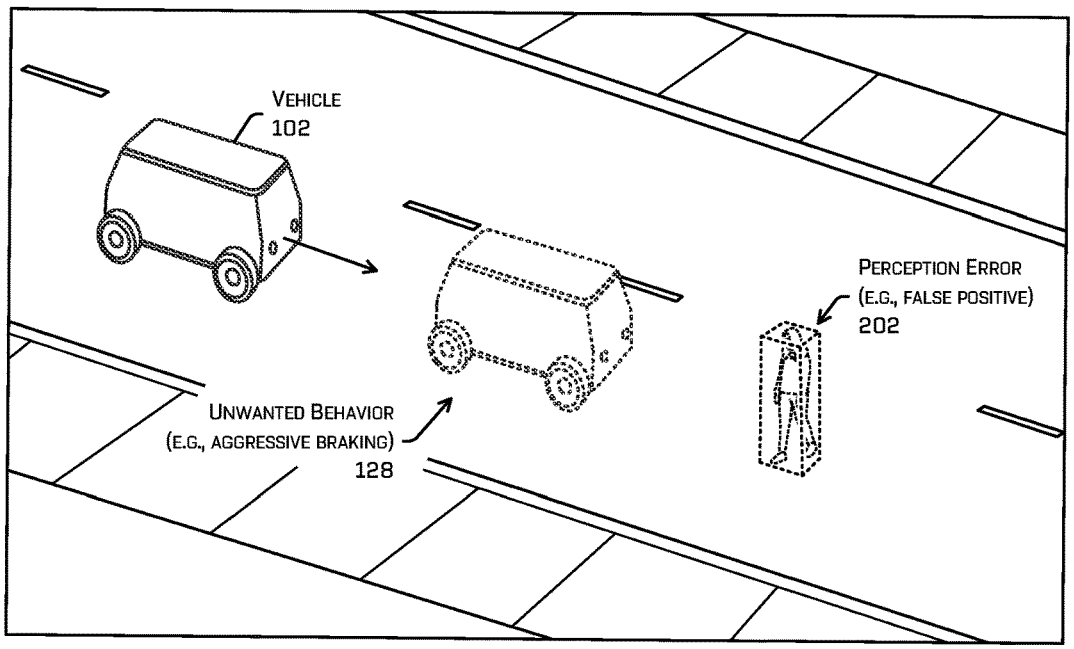
FIG. 3A illustrates another example in which a perception error contributes to an unwanted behavior of a vehicle.

FIG. 3A illustrates another example 300 in which a perception error 202 contributes to an unwanted behavior 128 of a vehicle 102. The perception error 202 illustrated in the example 300 is a false positive detection of a pedestrian crossing the road in front of the vehicle 102. That is, in actuality, the pedestrian of the false positive detection is not actually crossing the road in front of the vehicle 102.

In some examples, the perception error 202 may have effects on downstream components associated with the vehicle 102. For instance, the planner component associated with the vehicle 102 may determine to stop the vehicle 102 to avoid a collision with the falsely detected pedestrian. However, to do so, the planner component may cause the vehicle 102 to brake aggressively. Such aggressive braking of the vehicle 102 for no actual reason could lead to adverse events, such as collisions with other vehicles following the vehicle 102, occupants of the vehicle 102 becoming uncomfortable, damage to cargo carried by the vehicle 102, or the like. In addition to the aggressive braking, or in the alternative, the vehicle 102 could aggressively swerve, tap the brakes, change lanes, or the like, each of which would also be considered unwanted behaviors. In some examples, the unwanted behavior 128 of the vehicle 102 may contribute to an adverse event, such as a collision or increased risk of a collision. For instance, aggressive braking could cause another vehicle that is following the vehicle 102 to collide with the vehicle 102.

Figure 3B:
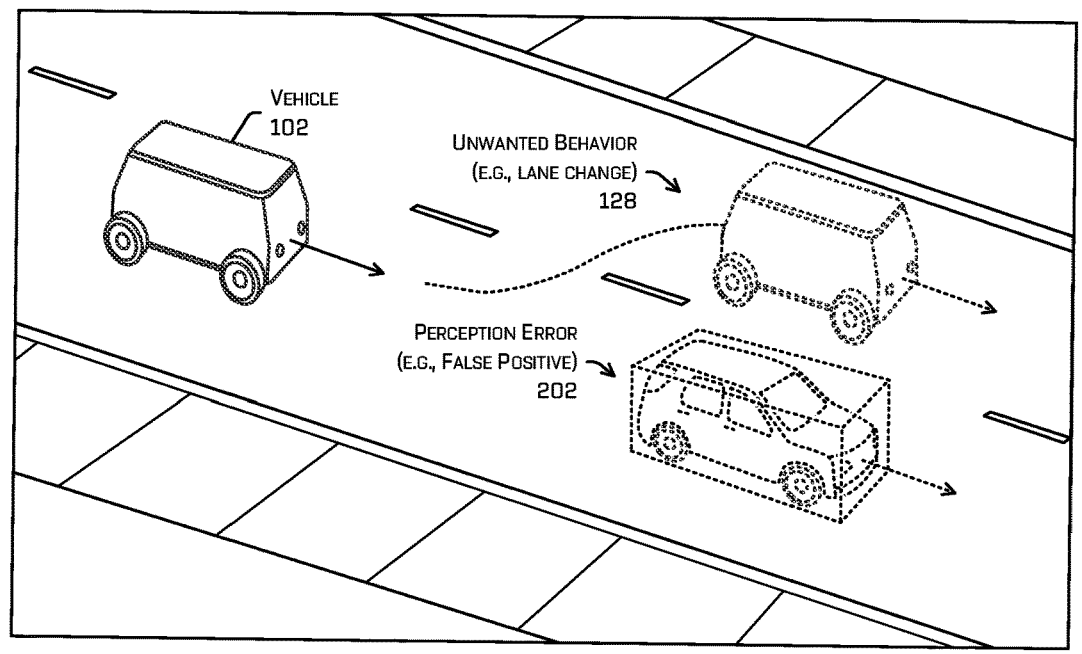
FIG. 3B illustrates yet another example in which a perception error contributes to an unwanted behavior of a vehicle.

FIG. 3B illustrates yet another example 310 in which a perception error 202 contributes to an unwanted behavior 128 of a vehicle 102. The perception error 202 illustrated in the example 310 is a false positive detection of another vehicle in front of the vehicle 102. That is, in actuality, the vehicle of the false positive detection is not actually driving in front of the vehicle 102.

In some examples, the perception error 202 may have effects on downstream components associated with the vehicle 102. For instance, the planner component associated with the vehicle 102 may determine to cause the vehicle 102 to change lanes in order to overtake or otherwise pass the falsely detected vehicle. However, changing lanes for no actual reason could lead to adverse events, such as collisions with other vehicles, occupants of the vehicle 102 becoming uncomfortable, or the like. In addition to changing lanes, or in the alternative, the vehicle 102 could aggressively swerve, tap the brakes, or the like, each of which would also be considered unwanted behaviors.

Figure 4:
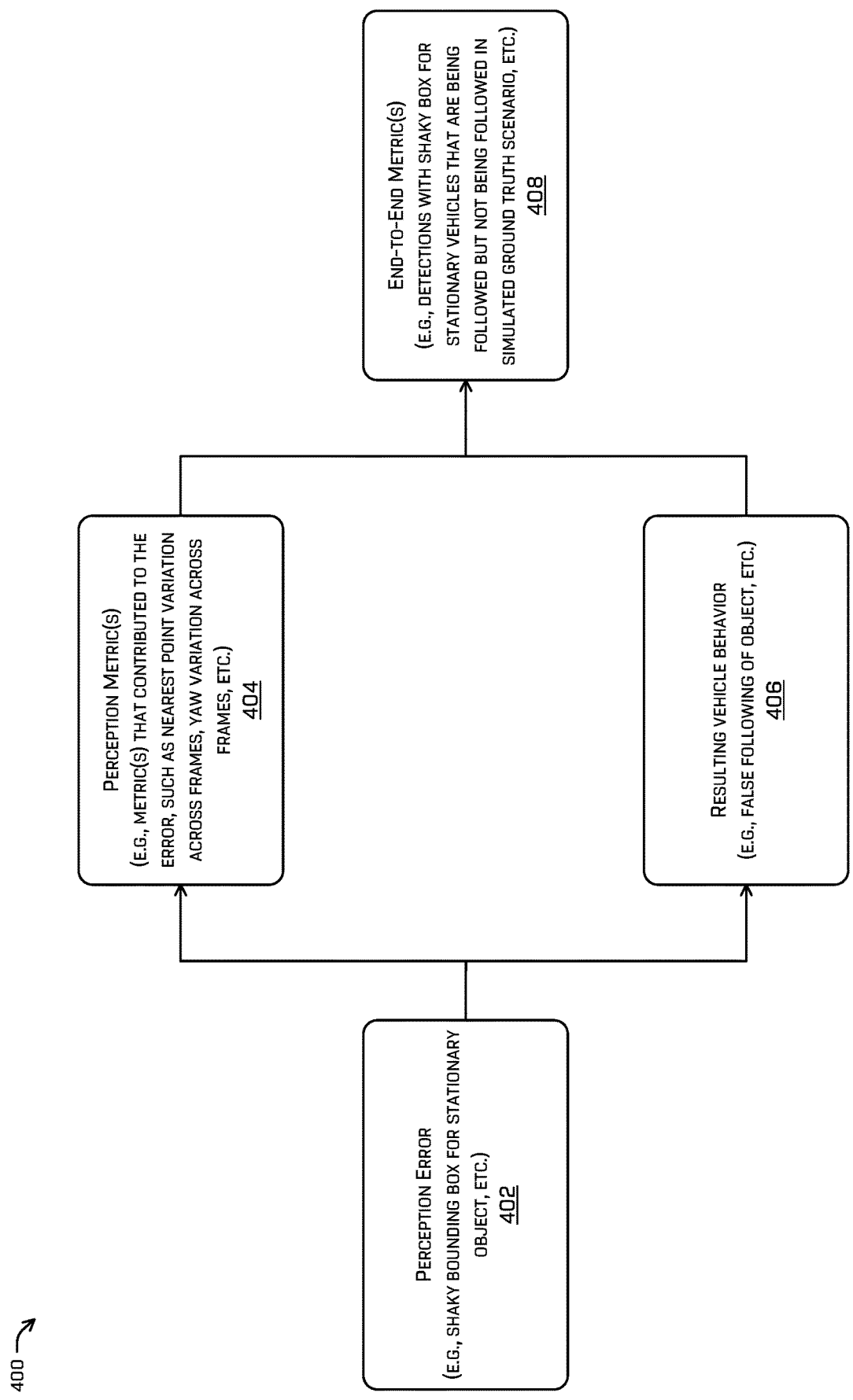
FIG. 4 is a flow diagram illustrating an example process associated with correlating perception errors with vehicle behavior to determine end-to-end perception metrics.

FIG. 4 is a flow diagram illustrating an example process 400 associated with correlating perception errors with vehicle behavior to determine end-to-end perception metrics. At 402, a perception error may be identified. For instance, the perception error may be an unstable bounding box associated with a stationary object, a yaw flip associated with an object, an incorrect bounding box size associated with an object, or the like.

At 404, a determination may be made as to which perception metric(s) contributed to the perception error. That is, for example, which perception metric(s) are most closely associated with the perception error. For instance, in the case of an unstable bounding box, the perception metric(s) that are most closely associated with this error are nearest point variation across frames and/or yaw variation across frames.

At 406, the resulting vehicle behavior caused by the perception error may be determined. For instance, in the case of the unstable bounding box, the resulting vehicle behavior may be a false following of the stationary object. In some examples, at 408, a correlation may be made between the perception metric(s) and the resulting vehicle behavior to define the end-to-end metric(s). Carrying on the example above, the end-to-end metric that may be defined can be to find cases in log data where detections with unstable bounding boxes for stationary vehicles that are being followed, but not being followed in simulated, ground truth scenarios. In order for the system to determine when these cases have occurred, the system may analyze the log data looking for cases in which the perception metric(s) indicate nearest point and yaw variation across frames and the vehicle is false following an object.

Figure 5:
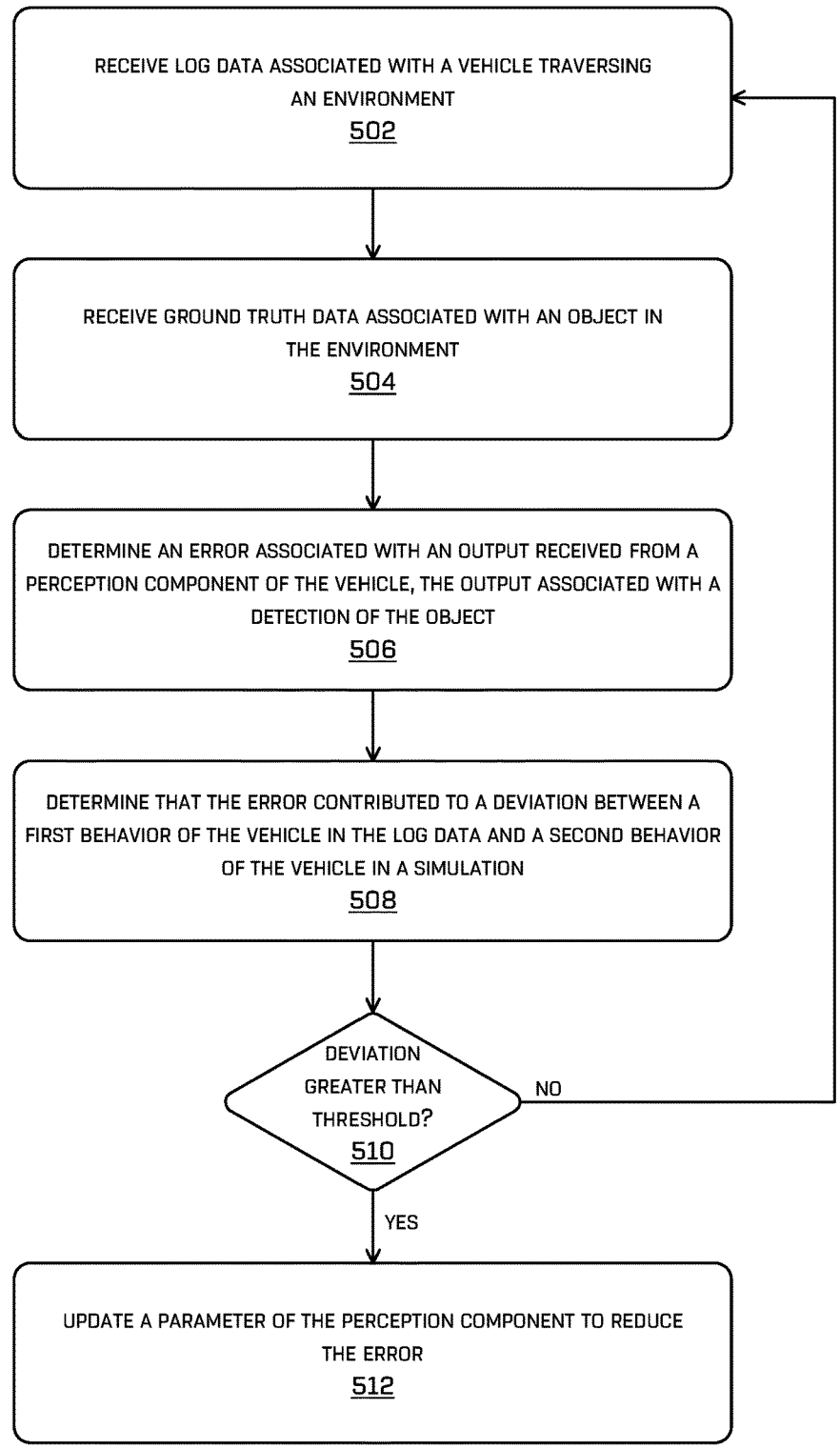
FIG. 5 is a flowchart illustrating an example process associated with correlating perception errors with unwanted vehicle behavior.

FIG. 5 is a flowchart illustrating an example process 500 associated with correlating perception errors with unwanted vehicle behavior. By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 500, the order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein. The process 500 illustrated may be described with reference to components and elements described above with reference to FIGS. 1-4 for convenience and ease of understanding. However, the process 500 is not limited to being performed using these components, and the components are not limited to performing the process 500.

The process 500 begins at operation 502, which includes receiving log data associated with a vehicle traversing an environment. For instance, the computing devices(s) 132 may receive log data associated with the vehicle 102 traversing the environment 104. In some examples, the log data may include the sensor data 106, the perception data 118, the driving instruction(s) 126, or other data. In some examples, the log data may include image data captured by one or more image sensors (e.g., cameras) of the vehicle, lidar data generated by one or more lidar sensors of the vehicle, radar data generated by one or more radar sensors of the vehicle, or the like. Additionally, in some examples, the log data may include a path that was traversed by the vehicle through the environment, a listing of faults associated with components of the vehicle that occurred while the vehicle was traversing the environment, video logs of the vehicle traversing the environment, and the like.

At operation 504, the process 500 includes receiving ground truth data associated with an object in the environment. For instance, the computing devices(s) 132 may the ground truth data 114 associated with the object. In some examples, the ground truth data 114 may comprise ground truth perception data that includes bounding boxes and other detections associated with the object, as well as other objects in the environment. In some examples, the ground truth data may be generated by a human labeler and be relatively free of errors that may otherwise be introduced by a perception component.

At operation 506, the process 500 includes determining an error associated with an output received from a perception component of the vehicle, the output associated with a detection of the object. For instance, the computing device(s) 132 may determine that the perception data 118 output by the perception component 116 includes the unstable bounding box 122 or other perception errors 202, such as false positive detections, false negative detections, over or under segmentation, yaw flip errors, articulation errors, velocity errors, classification errors, or the like. In some examples, the error may be determined based at least in part on a comparison between the perception output(s) and a labeled ground truth associated with the object. Additionally, or alternatively, the error may be determined based at least in part on one or more metrics associated with the output, the one or more metrics indicating differences between the output and the ground truth.

At operation 508, the process 500 includes determining that the error contributed to a deviation between a first behavior of the vehicle in the log data and a second behavior of the vehicle in a simulation. In some examples, the simulation may be of a planner component of the vehicle using the ground truth data. For instance, the computing device(s) 132 may determine that the unstable bounding box 122 perception error contributes to the unwanted behavior 128 of the vehicle 102. In some examples, the first behavior and second behavior of the vehicle may be an action performed by the vehicle, such as accelerating, decelerating, stopping, swerving, changing lanes, yielding to an object, refraining from yielding to an object, following an object, tapping the brakes, overtaking or passing an object, or any other action that can be performed by a vehicle.

In some examples, the simulation may be ran using the planner component of the vehicle where, instead of inputting the perception data into the planner component, the ground truth perception data (e.g., perception outputs that are user-labeled or otherwise do not contain errors) may be used as the inputs to the planner component. In this way, the outputs of the planner component (e.g., trajectories that the vehicle is to follow) are not affected by the perception errors. As such, if the planner component causes the vehicle to perform an action or behavior based on the ground truth perception data, and if that action or behavior is different from actions or behaviors caused by the planner based on the faulty perception data, then those actions or behaviors may be classified as unwanted, in some instances. For example, if the perception error is associated with a detected velocity of an object, the unwanted behavior of the vehicle may include following the object instead of overtaking or passing the object. As another example, if the perception error is associated with a detected size of the object, the unwanted behavior of the vehicle may include decelerating or stopping the vehicle instead of maintaining velocity. As yet another example, if the error is associated with a detected orientation of the object, the unwanted behavior of the vehicle may include either one of yielding to the object or refraining to yield to the object.

At operation 510, the process 500 includes determining whether the deviation between the first behavior and the second behavior is greater than a threshold deviation. In some examples, a measure of impact associated with the error may be determined based at least in part on the difference between the first behavior of the vehicle and the second behavior of the vehicle, and whether the deviation is greater than the threshold may be based at least in part on the measure of the impact. If the deviation is greater than the threshold, the process 500 proceeds to operation 512. However, if the deviation is less than the threshold, the process 500 may proceed back to operation 502.

At operation 512, the process 500 includes updating a parameter of the perception component to reduce the error. For instance, the computing device(s) 132 may update the parameter of the perception component 116 to reduce the error. In some examples, the parameter of the perception component may be updated based at least in part on a magnitude of the error or based at least in part on the error contributing to the unwanted behavior of the vehicle. In some examples, an updated version of the perception component that includes the one or more updated parameters may be sent to one or more vehicles of a fleet of vehicles. The one or more vehicles may utilize the updated perception components to make detections associated with objects while traversing an environment. Additionally, in some examples, the parameter may be updated based at least in part on the measure of the impact of the error.

Figure 6:
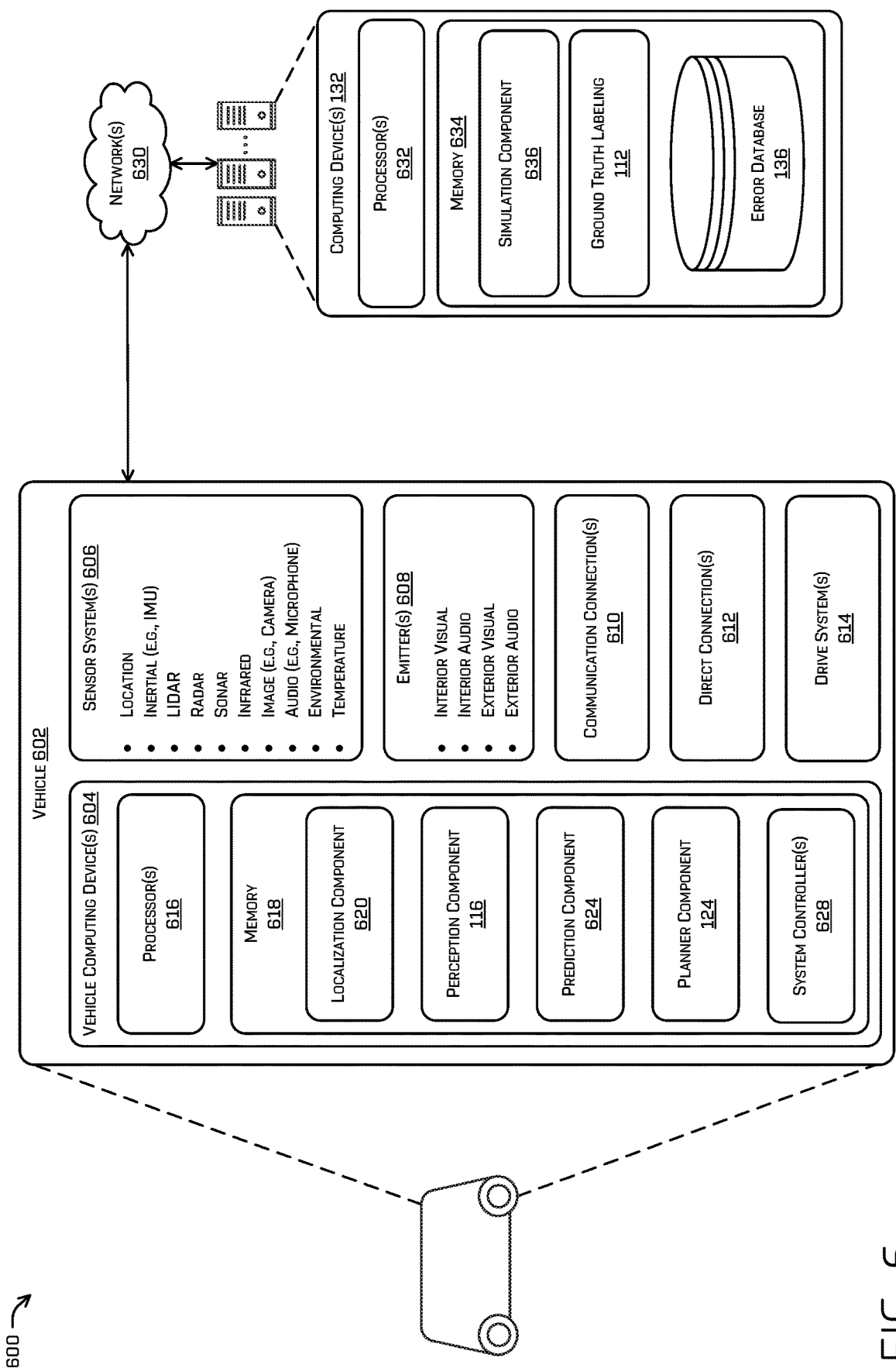
FIG. 6 is a block diagram illustrating an example system that may be used for performing the techniques described herein.

FIG. 6 is a block diagram illustrating an example system 600 that may be used for performing the techniques described herein. In at least one example, a vehicle 602, which can correspond to the vehicle 102 described above with reference to FIGS. 1-6, can include one or more vehicle computing devices 604, one or more sensor systems 606, one or more emitters 608, one or more communication connections 610, at least one direct connection 612, and one or more drive systems 614.

In at least one example, a vehicle 602 can be an autonomous vehicle configured to operate according to a Level 5 classification issued by the U.S. National Highway Traffic Safety Administration, which describes a vehicle capable of performing all safety-critical functions without the driver (or occupant) being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, the perception component 116, a prediction component 624, a planner component 124, and one or more system controllers 628.

In at least one example and as described above, the localization component 620 can determine a pose (position and orientation) of the vehicle 602 in relation to a local and/or global map based at least in part on sensor data received from the sensor system(s) 606 and/or map data associated with a map of an environment in which the vehicle 602 is operating. In at least one example, the localization component 620 can include, or be associated with, a calibration component that is capable of performing operations for calibrating (determining various intrinsic and extrinsic parameters associated with any one or more of the sensor system(s) 606), localizing, and mapping substantially simultaneously.

In at least one example, the perception component 116 can perform object detection, segmentation, and/or classification based at least in part on sensor data received from the sensor system(s) 606. In at least one example, the perception component 116 can receive raw sensor data (e.g., from the sensor system(s) 606). In at least one example, the perception component 116 can receive sensor data and can utilize one or more processing algorithms and/or machine-learned models to perform object detection, segmentation, and/or classification with respect to object(s) identified in the sensor data. In some examples, the perception component 116 can associate a bounding region (e.g., bounding box or otherwise an instance segmentation) with an identified object and can associate a confidence score associated with a classification of the identified object with the identified object.

The prediction component 624 can receive sensor data from the sensor system(s) 606, map data, and/or perception data output from the perception component 116 (e.g., processed sensor data), and can output predictions associated with one or more objects within the environment of the vehicle 602. Predictions can include predicted trajectories associated with objects in the environment in which the vehicle 602 is operating.

The planner component 124 may receive data, information, and/or outputs from the localization component 620, the perception component 116, the prediction component 624, as well as map data, and may generate one or more proposed vehicle operations (e.g., proposed trajectories). Additional details of localization components, perception components, prediction components, and/or planner components that are usable can be found in U.S. Pat. No.

9,612,123, issued on Apr. 4, 2017, and U.S. Pat. No. 10,363,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

In at least one example, the vehicle computing device(s) 604 can include one or more system controllers 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

While the components described above are illustrated as "onboard" the vehicle 602, in other implementations, the components can be remotely located and/or accessible to the vehicle 602. For instance, the component can be remotely located on the computing device(s) 132 and accessible to the vehicle 602 via one or more network(s) 630. Furthermore, while the components are described above as "components," such components can comprise one or more components and/or modules, which can be part of a system, for performing operations attributed to each of the components.

In at least one example, the localization component 620, the perception component 116, the prediction component 624, and the planner component 124 can process data, as described above, and can send their respective outputs over the network(s) 630, to computing device(s) 132. In at least one example, the localization component 620, the perception component 116, the prediction component 624, and the planner component 124 can send their respective outputs to the computing device(s) 132 at a particular frequency, after a lapse of a predetermined period of time, in near real-time, etc.

In at least one example, the sensor system(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 606 can provide input to the vehicle computing device(s) 604. In some examples, the sensor system(s) 606 can preprocess at least some of the sensor data prior to sending the sensor data to the vehicle computing device(s) 604. In at least one example, the sensor system(s) 606 can send sensor data, via the network(s) 630, to the computing device(s) 132 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 132, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 630. For example, the communications connection(s) 610 can enable Wi-Fi-based communication such as via frequencies defined by the IEEE 602.11 standards, short range wireless frequencies such as BLUETOOTH®, or any suitable wired or wireless communications protocol that enables the respective computing device to interface with the other computing device(s).

The direct connection 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor system(s) 606, emitter(s) 608, and the communication connection(s) 610 are shown onboard the vehicle 602. However, in some examples, the vehicle computing device(s) 604, sensor system(s) 606, emitter(s) 608, and the communication connection(s) 610 can be implemented outside of an actual vehicle (i.e., not onboard the vehicle 602).

As described above, the vehicle 602 can send data to the computing device(s) 132, via the network(s) 630. In some examples, the vehicle 602 can send raw sensor data to the computing device(s) 132. In other examples, the vehicle 602 can send processed sensor data and/or representations of sensor data to the computing device(s) 132 (e.g., data output from the localization component 620, the perception component 116, the prediction component 624, the planner component 124, the machine-learned models, etc.). In some examples, the vehicle 602 can send data to the computing device(s) 132 at a particular frequency, after a lapse of a predetermined period of time, in near real-time, etc.

The computing device(s) 132 can receive the data (raw or processed) from the vehicle 602 and/or other data collection devices, as well as data from one or more third party sources and/or systems. In at least one example, the computing device(s) 132 can include processor(s) 632 and memory 634 communicatively coupled with the processor(s) 632. In the illustrated example, the memory 634 of the computing device(s) 132 stores a simulation component 636, the ground truth labeling component 112, and the error database 136. In some examples, one or more of the systems and/or components can be associated with the vehicle 602 or other computing device(s) associated with the system 600 instead of, or in addition to, being associated with the memory 634 of the computing device(s) 132.

The simulation component 636 may include functionality for running simulations associated with the vehicle 602. For instance, the simulation component 636 may include functionality for running simulations of the planner component, prediction component, or other components using ground truth data. In this way, the simulation component 636 may run simulations so that vehicle behavior based on perception errors can be analyzed to determine if the behavior is unwanted.

The processor(s) 616 of the vehicle 602 and the processor(s) 632 of the computing device(s) 132 can be any suitable processor capable of executing instructions to process data and perform operations as described herein. By way of example and not limitation, the processor(s) 616 and 632 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 634 are examples of non-transitory computer-readable media. Memory 618 and 634 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 132 and/or the components of the computing device(s) 132 can be associated with the vehicle 602. That is, the vehicle 602 can perform one or more of the functions associated with the computing device(s) 132, and vice versa.

Furthermore, while the vehicle computing device(s) 604 and the computing device(s) 132 are shown to include multiple components, in some examples, such components can be associated with more or fewer individual components. For example, the localization component 620, the perception component 116, the prediction component 624, and/or the planner component 124 can be combined into a single component. That is, while depicted as separate components, any one or more of the components can be combined.

EXAMPLE CLAUSES

A. A system comprising: one or more processors: and one or more non-transitory computer-readable media storing instructions that, when executed by the one or more processors, cause the system to perform operations comprising: determining a deviation of an output of a perception component of a vehicle: determining a deviation of a behavior of a planner component of the vehicle: determining that an end-to-end metric has been impacted, wherein the end-to-end metric is based at least in part on a combination of the deviation of the behavior of the planner component and the deviation of the output of the perception component: determining a measure of impact associated with the end-to-end metric: and based at least in part on the measure of impact associated with the end-to-end metric, updating a parameter of the perception component to reduce the deviation of the output.

B. The system as recited in paragraph A, wherein: the deviation of the output of the perception component comprises an unstable bounding box associated with a parked vehicle in an environment of the vehicle: and the deviation of the behavior of the planner component comprises attempting to follow the parked vehicle instead of overtaking the parked vehicle.

C. The system as recited in any one of paragraphs A-B, the operations further comprising: determining another deviation of another output of the perception component; determining that the other deviation of the other output of the perception component does not contribute to another deviation of the behavior of the planner component: and determining that the end-to-end metric has not been impacted based at least in part on the other deviation of the other output of the perception component not contributing to the other deviation of the behavior of the planner component.

D. The system as recited in any one of paragraphs A-C, wherein the deviation of the output of the perception component comprises at least one of: an unstable bounding box associated with an object in an environment of the vehicle: an inaccurate detection of size of the object: an inaccurate detection of orientation of the object: an inaccurate detection of velocity of the object: a failure to detect the object: a false-positive detection of another object not present in the environment: or an inaccurate classification of the object.

E. The system as recited in any one of paragraphs A-D, wherein: the output of the perception component is determined, by the perception component, based at least in part on sensor data associated with the vehicle traversing an environment, and the behavior of the planner component is based at least in part on the output of the perception component.

F. A method comprising: determining that an end-to-end metric associated with a vehicle has been impacted, the end-to-end metric determined based at least in part on a combination of a deviation of a behavior of a planner component associated with the vehicle and a deviation of an output of a perception component associated with the vehicle; determining a measure of impact associated with the end-to-end metric: and based at least in part on the measure of impact associated with the end-to-end metric, updating a parameter of the perception component to obtain an updated parameter that reduces the deviation of the output.

G. The method as recited in paragraph F, further comprising sending, to one or more vehicles of a fleet of vehicles, an updated version of the perception component that includes the updated parameter.

H. The method as recited in any one of paragraphs F-G, wherein: the deviation of the output of the perception component is associated with a detected velocity of an object in an environment of the vehicle, and the deviation of the behavior of the planner component comprises causing the vehicle to follow the object instead of overtaking the object.

I. The method as recited in any one of paragraphs F-H, wherein the end-to-end metric is a first end-to-end metric, the method further comprising determining that a second end-to-end metric associated with the vehicle has been impacted, the second end-to-end metric different from the first end-to-end metric, the second end-to-end metric determined based at least in part on a different combination of another deviation of another behavior of the planner component and another deviation of another output of the perception component.

J. The method as recited in any one of paragraphs F-I, wherein: the deviation of the output of the perception component is associated with an inaccurate detection of an orientation of an object in an environment of the vehicle, and the deviation of the behavior of the planner component comprises causing the vehicle to yield to the object rather than refraining from yielding to the object.

K. The method as recited in any one of paragraphs F-J, wherein the deviation of the output of the perception component comprises at least one of: an unstable bounding box associated with an object: an inaccurate detection of size of the object: an inaccurate detection of orientation of the object: an inaccurate detection of a velocity of the object: a failure to detect the object: a false-positive detection of another object not present in the environment: or an inaccurate classification of the object.

L. The method as recited in any one of paragraphs F-K, wherein the deviation of the output of the perception component is determined based at least in part on a metric associated with the output, the metric indicating a difference between the output and ground truth data associated with an object in an environment of the vehicle, the metric comprising at least one of: a yaw metric: a nearest point metric: a segmentation metric: a velocity metric: a false negative metric: a false positive metric: a size metric: or a classification metric.

M. The method as recited in any one of paragraphs F-L, wherein: the deviation of the output of the perception component comprises an unstable bounding box associated with a parked vehicle in an environment of the vehicle, and the deviation of the behavior of the planner component comprises causing the vehicle to attempt to follow the parked vehicle instead of overtake the parked vehicle.

N. The method as recited in any one of paragraphs F-M, wherein the deviation of the output of the perception component is determined based at least in part on: receiving labeled ground truth perception data: and determining a difference between the output and the labeled ground truth perception data.

O. The method as recited in any one of paragraphs F-N, wherein determining that the end-to-end metric associated with the vehicle has been impacted comprises: receiving labeled ground truth perception data associated with the vehicle traversing an environment; and running a simulation of the planner component based at least in part on the labeled ground truth perception data, wherein the planner component causes the vehicle to perform the behavior during the simulation.

P. The method as recited in any one of paragraphs F-O, wherein the measure of impact associated with the end-to-end metric comprises at least one of: a difference in a trajectory of the vehicle between log data associated with the vehicle and a simulation: a difference in an action performed by the vehicle between the log data and the simulation: a difference in a rate of acceleration or deceleration of the vehicle between the log data and the simulation: or a difference in a steering angle of the vehicle between the log data and the simulation.

Q. The method as recited in any one of paragraphs F-P, wherein the deviation of the behavior of the planner component is determined based at least in part on: receiving labeled ground truth perception data: running a simulation of the planner component based at least in part on the labeled ground truth perception data: and determining a difference between the behavior of the planner component and a simulated behavior of the planner component based on the labeled ground truth perception data in the simulation.

R. The method as recited in any one of paragraphs F-Q, wherein: the deviation of the output of the perception component is associated with an inaccurate detection of a size of an object in an environment of the vehicle, and the deviation of the behavior of the planner component comprises causing the vehicle to at least one of decelerate or stop.

S. One or more non-transitory computer-readable media storing computer-executable instructions that, when executed, cause one or more processors to perform operations comprising: determining that an end-to-end metric associated with a vehicle has been impacted, the end-to-end metric determined based at least in part on a combination of a deviation of a behavior of a planner component associated with the vehicle and a deviation of an output of a perception component associated with the vehicle: determining a measure of impact associated with the end-to-end metric: and based at least in part on the measure of impact associated with the end-to-end metric, updating a parameter of the perception component to obtain an updated parameter that reduces the deviation of the output.

T. The one or more non-transitory computer-readable media as recited in paragraph S, the operations further comprising sending, to one or more vehicles of a fleet of vehicles, an updated version of the perception component that includes the updated parameter.

U. The one or more non-transitory computer-readable media as recited in paragraph S or T, the operations further comprising: determining another deviation of another output of the perception component: determining that the other deviation of the other output of the perception component does not contribute to another deviation of the behavior of the planner component: and determining that the end-to-end metric has not been impacted based at least in part on the other deviation of the other output of the perception component not contributing to the other deviation of the behavior of the planner component.

While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions that, when executed by the one or more processors, cause the system to perform operations comprising:
      determining a deviation of an output of a perception component of a vehicle;
      determining a deviation of a behavior of a planner component of the vehicle;
      determining that an end-to-end metric has been impacted, wherein the end-to-end metric is based at least in part on a combination of the deviation of the behavior of the planner component and the deviation of the output of the perception component;
      determining a measure of impact associated with the end-to-end metric;
      based at least in part on the measure of impact associated with the end-to-end metric, updating a parameter of the perception component as an altered perception component to reduce an error;
      transmitting, to the vehicle, the altered perception component, wherein the vehicle is controlled based at least in part on the altered perception component.

2. The system of claim 1, the operations further comprising:
   determining a second deviation of second output of the perception component;
   determining that the second deviation of the second output of the perception component does not contribute to a second deviation of the behavior of the planner component; and
   determining that the end-to-end metric has not been impacted based at least in part on the second deviation of the second output of the perception component not contributing to the second deviation of the behavior of the planner component.

3. The system of claim 1, wherein the deviation of the output of the perception component comprises at least one of:
   an unstable bounding box associated with an object in an environment of the vehicle;
   an inaccurate detection of size of the object;
   an inaccurate detection of orientation of the object;
   an inaccurate detection of velocity of the object;
   a failure to detect the object;
   a false-positive detection of another object not present in the environment; or
   an inaccurate classification of the object.

4. The system of claim 1, wherein:
   the output of the perception component is determined, by the perception component, based at least in part on sensor data associated with the vehicle traversing an environment, and
   the behavior of the planner component is based at least in part on the output of the perception component.

5. The system of claim 1, wherein:
   the deviation of the output of the perception component comprises an unstable bounding box associated with a parked vehicle in an environment of the vehicle; and
   the deviation of the behavior of the planner component comprises attempting to follow the parked vehicle instead of overtaking the parked vehicle.

6. A method comprising:
   determining that an end-to-end metric associated with a vehicle has been impacted, the end-to-end metric determined based at least in part on a combination of a deviation of a behavior of a planner component associated with the vehicle and a deviation of an output of a perception component associated with the vehicle;
   determining a measure of impact associated with the end-to-end metric;
   based at least in part on the measure of impact associated with the end-to-end metric, updating a parameter of the perception component to obtain an updated parameter that reduces an error; and transmitting, to the vehicle, the updated parameter, wherein the vehicle is controlled based at least in part on the updated parameter.

7. The method of claim 6, further comprising sending, to one or more vehicles of a fleet of vehicles, an updated version of the perception component that includes the updated parameter.

8. The method of claim 6, wherein:
the deviation of the output of the perception component is associated with a detected velocity of an object in an environment of the vehicle, and
the deviation of the behavior of the planner component comprises causing the vehicle to follow the object instead of overtaking the object.

9. The method of claim 6, wherein the end-to-end metric is a first end-to-end metric, the method further comprising determining that a second end-to-end metric associated with the vehicle has been impacted, the second end-to-end metric different from the first end-to-end metric, the second end-to-end metric determined based at least in part on a different combination of another deviation of another behavior of the planner component and another deviation of another output of the perception component.

10. The method of claim 6, further comprising:
determining that a plurality of end-to-end metrics associated with the vehicle have been impacted, including the end-to-end metric;
aggregating results from the plurality of end-to-end metrics; and
characterizing a performance of the perception component based at least in part on the aggregating the results.

11. The method of claim 6, wherein the deviation of the output of the perception component comprises at least one of:
an unstable bounding box associated with an object;
an inaccurate detection of size of the object;
an inaccurate detection of orientation of the object;
an inaccurate detection of a velocity of the object;
a failure to detect the object;
a false-positive detection of another object not present in an environment; or
an inaccurate classification of the object.

12. The method of claim 6, wherein the deviation of the output of the perception component is determined based at least in part on a metric associated with the output, the metric indicating a difference between the output and ground truth data associated with an object in an environment of the vehicle, the metric comprising at least one of:
a yaw metric;
a nearest point metric;
a segmentation metric;
a velocity metric;
a false negative metric;
a false positive metric;
a size metric; or
a classification metric.

13. The method of claim 6, wherein:
the deviation of the output of the perception component comprises an unstable bounding box associated with a parked vehicle in an environment of the vehicle, and
the deviation of the behavior of the planner component comprises causing the vehicle to attempt to follow the parked vehicle instead of overtake the parked vehicle.

14. The method of claim 6, wherein the deviation of the output of the perception component is determined based at least in part on:

receiving labeled ground truth perception data; and
determining a difference between the output and the labeled ground truth perception data.

15. The method of claim 6, wherein determining that the end-to-end metric associated with the vehicle has been impacted comprises:
receiving labeled ground truth perception data associated with the vehicle traversing an environment; and
running a simulation of the planner component based at least in part on the labeled ground truth perception data, wherein the planner component causes the vehicle to perform the behavior during the simulation.

16. The method of claim 6, wherein the measure of impact associated with the error comprises at least one of:
a difference in a trajectory of the vehicle between log data associated with the vehicle and a simulation;
a difference in an action performed by the vehicle between the log data and the simulation;
a difference in a rate of acceleration or deceleration of the vehicle between the log data and the simulation; or
a difference in a steering angle of the vehicle between the log data and the simulation.

17. The method of claim 6, wherein the deviation of the behavior of the planner component is determined based at least in part on:
receiving labeled ground truth perception data;
running a simulation of the planner component based at least in part on the labeled ground truth perception data; and
determining a difference between the behavior of the planner component and a simulated behavior of the planner component based on the labeled ground truth perception data in the simulation.

18. One or more non-transitory computer-readable media storing computer-executable instructions that, when executed, cause one or more processors to perform operations comprising:
receiving log data associated with a vehicle traversing an environment;
determining, based at least in part on the log data, an error associated with an output received from a perception component of the vehicle, wherein the output is associated with a detection of an object in the environment;
determining that the error contributed to a deviation between a first behavior of the vehicle in the log data and a second behavior of the vehicle in a simulation;
determining a measure of impact associated with the error;
based at least in part on the measure of impact associated with the error, updating a parameter of the perception component to obtain an updated parameter that reduces the error; and
transmitting, to the vehicle, the updated parameter, wherein the vehicle is controlled based at least in part on the updated parameter.

19. The one or more non-transitory computer-readable media of claim 18, the operations further comprising sending, to one or more vehicles of a fleet of vehicles, an updated version of the perception component that includes the updated parameter.

20. The one or more non-transitory computer-readable media of claim 18, wherein:
the error is associated with a detected velocity of the object, the first behavior of the vehicle comprises following the object, and the second behavior of the vehicle comprises overtaking the object;

the error is associated with a detected size of the object and the first behavior of the vehicle comprises decelerating the vehicle; or the error is associated with a detected orientation of the object and the first behavior of the vehicle comprises one of yielding to the object or refraining to yield to the object.

\* \* \* \* \*